(No Model.)

W. H. LEWIS.
SHUTTER FOR PHOTOGRAPHIC CAMERAS.

No. 359,797. Patented Mar. 22, 1887.

WITNESSES:
Donn Twitchell.
C. Sedgwick

INVENTOR:
W. H. Lewis
BY Munn & Co
ATTORNEYS.

UNITED STATES PATENT OFFICE.

WILLIAM H. LEWIS, OF BROOKLYN, ASSIGNOR TO E. & H. T. ANTHONY & CO., OF NEW YORK, N. Y.

SHUTTER FOR PHOTOGRAPHIC CAMERAS.

SPECIFICATION forming part of Letters Patent No. 359,797, dated March 22, 1887.

Application filed December 28, 1886. Serial No. 222,789. (No model.)

*To all whom it may concern:*

Be it known that I, WILLIAM H. LEWIS, of Brooklyn, in the county of Kings and State of New York, have invented a new and useful Improvement in Shutters for Photographic Cameras, of which the following is a full, clear, and exact description.

This invention relates to shutters for photographic cameras adapted to both instantaneous and time work; and it consists in certain novel constructions and combinations of parts and mechanism for controlling the shutter, substantially as hereinafter described, and pointed out in the claims.

The invention, although here shown applied to the inner face of the front board or plate of a camera having simply a light-aperture through it and designed to be used in connection with a fixed lens-tube in rear of said board, is also applicable to other cameras having adjustable lens-tubes, and may be otherwise arranged.

Reference is to be had to the accompanying drawings, forming a part of this specification, in which similar letters of reference indicate corresponding parts in all the figures.

Figure 1:
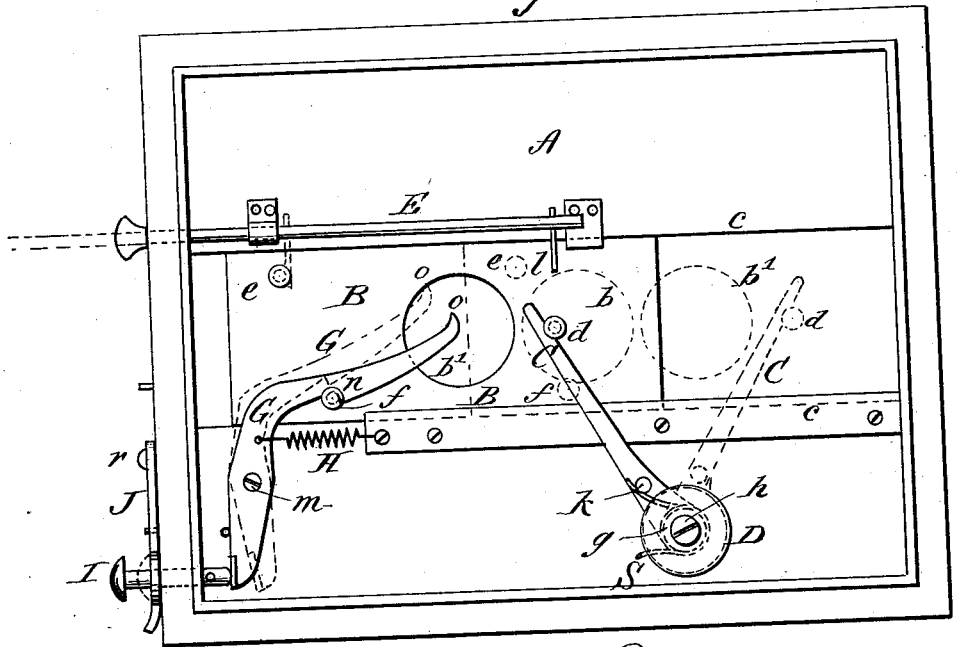
Figure 2:
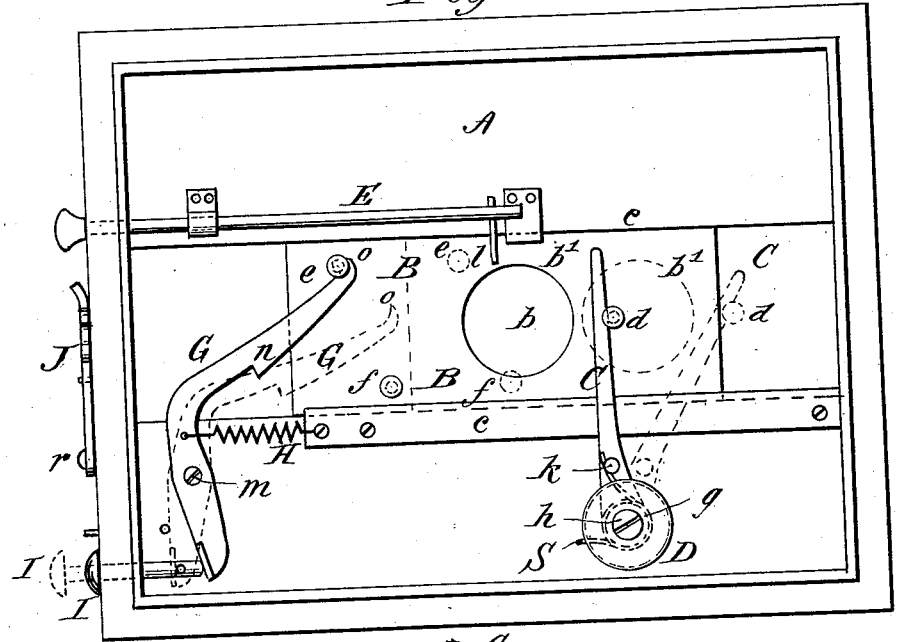
Figure 3:
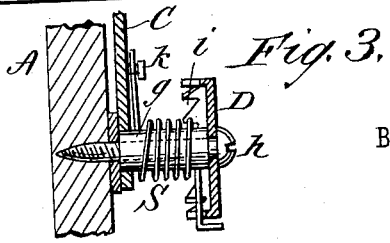

Figure 1 represents an inner face or back view of the shutter with its operating mechanism as adjusted for taking instantaneous pictures, and Fig. 2 is a similar view of like parts as adjusted for taking time pictures. Fig. 3 is a sectional view, upon a larger scale, in a plane at right angles to Figs. 1 and 2, of certain details for regulating the tension of the spring which throws the shutter.

A is the board or plate which carries the shutter, and $b$ the light-aperture or lens-opening therein.

B is the shutter provided with a corresponding aperture, $b'$, and fitted to slide in ways $c\ c$ across the board A. Projecting from the back of the shutter are studs or projections $d$, $e$, and $f$, the one, $d$, being upon the one side of the shutter-aperture and the others, $e\ f$, upon the opposite side thereof. The stud $d$ serves for a lever, C, used to throw the shutter, to bear against. This lever is fitted to turn or work upon a sleeve, $g$, on the inner face of a button, D, which is fitted upon a pin or screw, $h$, secured to the board A, and is of notched or ratchet construction, as at $i$, to receive the one end of the spring S, which throws the shutter, the other or free end of the spring, which is represented as a coiled one around the sleeve $g$, engaging with or bearing against a pin or stud, $k$, on the lever C. By means of the notched or ratchet button D the tension of the spring may be adjusted as required. The spring S, that engages by one end with any one of the notches of the button, may, by simply moving the said end of the spring in the right direction along the ratchet, be adjusted or taken up to compensate for lost tension, or to give increased tension to it to quicken the action of the shutter when required.

E is a sliding rod, suitably guided and capable of independent motion in direction of the shutter's course and passing out through the end of the board A, where it is provided with a knob, for the purpose of manipulating it. On or near the inner end of this rod is an attached pin or projection, $l$, which projects so as to come in contact, when required, with the stud $e$ on its rear side, and whereby the shutter D is drawn across the board A against the tension of the spring S.

G is a crooked lever, pivoted intermediately of its length, as at $m$, to the board A, and controlled by a spring, H, and push-pin I on opposite sides of its pivot. The one arm of this lever is constructed with a notched portion or tooth, $n$, that, when taking an instantaneous picture, engages with the stud $f$ as the shutter is drawn by the rod E to its one closing portion, and said arm of the lever G is further constructed with a crooked outer end portion, $o$, that, when taking a time picture, engages with the stud $e$ to hold the shutter open. This difference of action is controlled by varying the stroke of the push-pin I, and which may be done by an adjustable stop in the form of a catch, J, pivoted at $r$, and arranged so as to be thrown over the pin I, between its head and the end of the board, as shown in Fig. 1, or be thrown back out of the way of the head of the pin I, as shown in Fig. 2.

To take an instantaneous picture, the stop J is adjusted, as shown in Fig. 1, to limit the stroke of the push-pin I. Then, and before presenting the plate for exposure, the shutter is drawn by the rod E and stud e from its extreme back position (shown by dotted lines) to its extreme forward position, and so that its stud f engages with a notch or tooth, n, of a catch-lever, G, as shown by full lines, same figure. After this the rod E is shoved back or in again to its normal position, so as to put its pin l out of interference with the stud e. The parts are then in position for taking the picture, which is done by pressing the push-pin I inward till its head is arrested by the stop J. This shifts the catch-lever G and releases its notched or toothed portion n from the stud f, when the shutter D is quickly drawn back by the action of the spring S and lever C on the stud d, exposing the plate as the aperture b' of the shutter passes the aperture b in the board A.

To take a time picture, the stop J is adjusted or thrown back out of the way of the head of the push-pin I, as shown in Fig. 2, to allow of the push-pin being pressed farther inward. Then, and before presenting the plate for exposure, the shutter B is drawn by the rod E and stud e from its extreme back position (shown by dotted lines) to its extreme forward position, and so that its stud f engages with the notch or tooth n of the catch-lever G, and the rod E is shoved inward or back again to its normal position, all as hereinbefore described for taking an instantaneous picture. When pushing on the pin I, however, to release the catch-lever G from the stud f, said pin, having the stop J out of its way, moves farther inward, and this being done quickly, moves the lever G so that its crooked or hooked end o catches against or acts as a stop to the pin e, and finger-pressure still being applied to the pin I the shutter is arrested by the end o of the lever and stud e, with the aperture b' of the shutter in alignment with the aperture b in the board. Here the shutter is held by continuing pressure on the pin I during and for the full time it is required to expose the plate; but when fully exposed then the finger-pressure is removed from the pin I, which causes the spring S and lever C, acting on the stud d, to shoot the shutter fully back.

Having thus described my invention, what I claim as new, and desire to secure by Letters Patent, is—

1. The combination, with the apertured shutter of a photographic camera, of a rocking arm or lever for throwing the shutter, a button secured to the camera in concentric relation with the pivot or fulcrum of said lever and provided with a circular series of notches or ratchet-teeth, and a spring arranged to engage at its one end with the notched surface of the button and at its other end with the arm or lever, whereby the adjustment of the spring for regulating its tension is effected around the axial line of the pivot of the lever, and an extended range of adjustment with increased facility for securing it is obtained, substantially as specified.

2. In a shutter for photographic cameras, the combination, with the apertured sliding shutter B, having a stud or projection, d, of the button D, of notched or ratchet construction, as at i, and provided with a sleeve, g, the lever C, fitted so as to freely turn on said sleeve, and the spring S, coiled around said sleeve and arranged to engage at its opposite ends with the ratchet portion of the button D and with the lever C, essentially as shown and described.

3. In a shutter for photographic cameras, the combination, with the apertured shutter B, provided with means controlled by a spring for throwing it and having studs or projections e f, of the sliding rod E, constructed to engage with the stud e, for moving the shutter against the tension of its operating spring, the catch-lever G, having a toothed or notched portion, n, adapted to engage with the stud f, the spring H, and the push-pin I, substantially as specified.

4. The combination, with the push-pin I, of an adjustable stop adapted to vary and control the inward stroke or movement of said pin, the catch-lever G, provided with a tooth or notch, n, and having a crook, o, upon the outer end of one of its arms, the spring H, controlling said lever, the apertured shutter B, having studs e f and provided with means controlled by a spring for throwing it, and the sliding rod E, having a projection, l, essentially as and for the purposes herein set forth.

WILLIAM H. LEWIS.

Witnesses:
C. SEDGWICK,
E. M. CLARK.